United States Patent
Little (10) Patent No.: US 7,940,942 B2
(45) Date of Patent: May 10, 2011

(54) SELF-IDENTIFYING MICROPHONE (75) Inventor: Alexander H. Little, Belmont, CA (US)

(73) Assignee: Apple Inc., Cupertino, CA (US)

( * ) Notice: Subject to any disclaimer, the term of this patent is extended or adjusted under 35 U.S.C. 154(b) by 1153 days.

(21) Appl. No.: 10/748,024

(22) Filed: Dec. 30, 2003

(65) Prior Publication Data
US 2005/0147255 A1 Jul. 7, 2005

(51) Int. Cl.
*H04R 3/00* (2006.01)

(52) U.S. Cl. ........ 381/111; 381/112; 381/113; 381/114; 381/115; 381/122

(58) Field of Classification Search ............ 381/26, 381/58, 60, 59, 77, 122, 111–115; 700/94
See application file for complete search history.

(56) References Cited

U.S. PATENT DOCUMENTS

| | | | | |
|---|---|---|---|---|
| 3,950,607 A | * | 4/1976 | Southworth et al. | 348/22 |
| 5,943,649 A | * | 8/1999 | Fado et al. | 704/270 |
| 6,128,384 A | * | 10/2000 | Papadopoulos et al. | 379/413 |
| 6,356,084 B1 | * | 3/2002 | Levine | 324/556 |
| 6,421,448 B1 | * | 7/2002 | Arndt et al. | 381/312 |
| 6,594,363 B1 | * | 7/2003 | Kim | 381/58 |
| 6,882,577 B2 | * | 4/2005 | Chiu et al. | 365/189.01 |
| 7,054,957 B2 | * | 5/2006 | Armitage | 710/8 |

* cited by examiner

*Primary Examiner* — Xu Mei
*Assistant Examiner* — George Monikang
(74) *Attorney, Agent, or Firm* — Park, Vaughan, Fleming + Dowler LLP (57) ABSTRACT

A microphone including a connector with a plurality of electrical contacts. The microphone interfaces with a computer system via a digital bus. The microphone can transmit data to the computer system via the connector that is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

33 Claims, 7 Drawing Sheets

SELF-IDENTIFYING MICROPHONE

1. FIELD OF THE INVENTION

The present invention generally relates to microphones. More specifically, the present invention relates to microphones that communicate with computer systems via a digital bus.

2. BACKGROUND

The audio capabilities of modern computer systems have continually increased. For example, many modern computer systems provide ports that allow computer systems to interface with microphones and speakers. Typically, such interfaces are analog. Thus, the microphone port would include a connector, such as a stereo jack. The computer system would receive an analog signal from the microphone via the stereo jack, amplify the signal, and then convert the amplified signal into a digital signal. The digital signal would then be available to application programs, such as audio mixing programs, for further processing. Unfortunately, the pre-amplifiers utilized in many computer systems are of moderate to poor quality. As a result, the signal-to-noise ratio and audio fidelity of the amplified microphone signals are quite low.

In order to increase the signal-to-noise ratio and the audio fidelity of microphone signals, devices that are external to the computer system can be utilized to receive microphone signals. After receiving the analog microphone signals, the external devices then amplify and convert, using high-quality pre-amplifiers and analog-to-digital converters, then analog microphone signals into digital signals. The external devices then transmit the digital microphone signals to a computer system via a universal serial bus ("USB") or a 1394 bus. The signal-to-noise ratio and audio fidelity of the digital microphone signals are relatively high.

Application programs can further process the high fidelity microphone signals. For example, the frequency response of the microphone signals may be varied by tone controls or an equalizer. Also, the dynamic response of the microphone signals may be varied by a single or multi-band compressor. Similarly, the pitch of the digital audio signals may be varied to compensate for out of tune vocals or instruments. Digital microphone signals may even be processed so that the sound appears to originate from a selected location such as behind or in front of a listener.

In order to optimize the above application program processing, the digital microphone signals need to be properly configured. However, different types of microphones often require different adjustments. For example, the frequency response and dynamic response of a Sure SM58 (vocal) microphone is very different from the frequency response of a Sennheiser E605 (drum) microphone. In addition, different microphones of the same type can have different frequency and dynamic responses. For example, the frequency response of one Sure SM58 microphone may be slightly different from the frequency response of another Sure SM58 microphone. As a result, the operator of an audio mixing program, such as an audio engineer, is required to adjust audio channel settings such as frequency response, gain, compression, etc, for each microphone. Such adjustments require a substantial amount of skill and time.

Thus, a need exists to automatically configure audio channel settings so that microphone signals can be more efficiently processed.

3. SUMMARY OF THE INVENTION

One embodiment of the invention is a microphone that includes a connector with a plurality of electrical contacts. The microphone interfaces with a computer system via a digital bus, such as a USB or a 1394 bus. The microphone can transmit data to the computer system via the connector that is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

Another embodiment of the invention is a microphone with a plurality of electrical contacts for interfacing with an external device, such as an interface unit. The microphone contains a circuit that is connected to at least one electrical contact. The electrical contact provides the external device with data that identifies at least one of the following: the microphone manufacturer, the microphone manufacture date, the microphone model number, the microphone serial number, the microphone frequency response, whether the microphone uses phantom power, the desired pre-amplifier gain, and the microphone dynamic response.

Another embodiment of the invention is an interface unit that includes a first connector having a plurality of electrical contacts for interfacing with a microphone. The interface unit also includes a second connector having a plurality of electrical contacts for interfacing with a computer system via a digital bus. The interface unit can obtain data from the microphone related to at least one of the following: the microphone manufacturer, the microphone manufacture date, the microphone model number, the microphone serial number, the microphone frequency response, whether the microphone uses phantom power, the desired pre-amplifier gain, and the microphone dynamic response. In addition, the interface unit can transmit the data to the computer system.

Yet another embodiment of the invention is a method of transferring data to a computer system. The method includes interfacing a microphone with an interface unit and then interfacing the interface unit with a computer system. In addition, the method includes transferring data from the interface unit to the computer system. The data is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

Still another embodiment of the invention is a method of transferring data to a computer system. The method includes interfacing a microphone to a computer system. In addition, the method includes transferring data from the microphone to the computer system. The data is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

5. DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

5.1 Self-Identifying Microphone

Figure 1:
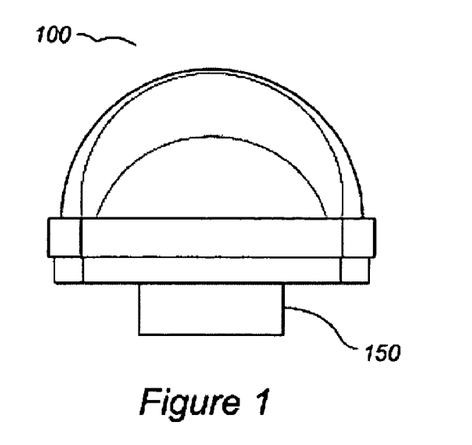
FIG. 1 presents a top view of a self-identifying microphone.
Figure 2:
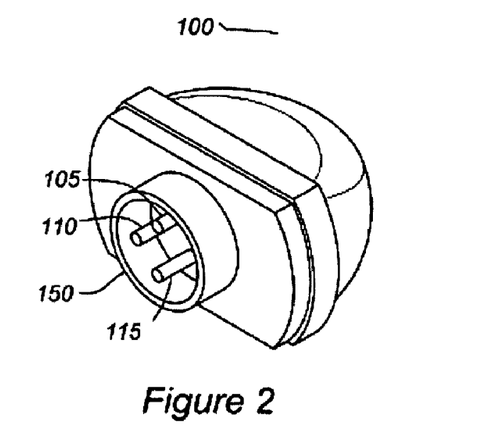
FIG. 2 presents an isometric view of the self-identifying microphone of FIG. 1.
Figure 3:
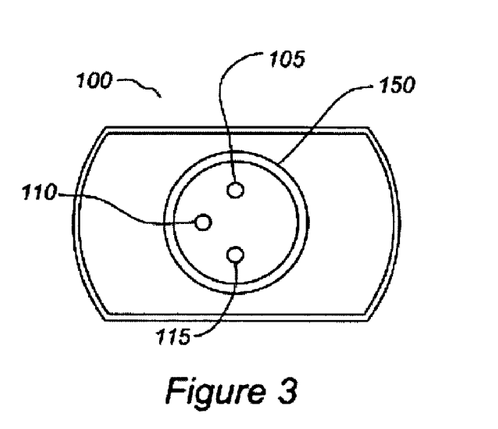
FIG. 3 presents a side view of the self-identifying microphone of FIG. 1.
Figure 4:
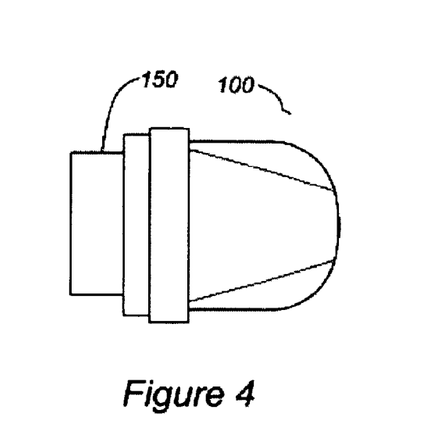
FIG. 4 presents another side view of the self-identifying microphone of FIG. 1.

One embodiment of the invention, such as shown in FIGS. 1 through 4, is a microphone that can provide information about the microphone to an external device, such as the interface unit 200 shown in FIGS. 7 through 10. Such a microphone will be referred to as a "self-identifying microphone." A self-identifying microphone, for example, may provide the external device with information that identifies the manufacturer and/or model number of the self-identifying microphone. The self-identifying microphone typically has a plurality of electrical contacts, such as pins. FIGS. 2 and 3 show a self-identifying microphone 100 with three pins. However, different embodiments of the invention may utilize a greater or lesser number of electrical contacts.

5.1.1 Open/Closed Coding

As shown in FIGS. 2 and 3, self-identifying microphone 100 includes pin 105, 110, and 115. Pin 105 may be an analog ground pin. Similarly, pin 110 may be an analog signal pin that transmits the un-amplified microphone signal. In one embodiment of the invention, identification pin 115 may be utilized to identify the microphone to an external device, such as interface unit 200. For example, if the self-identifying microphone 100 was of a first type, then identification pin 115 could be electrically connected, i.e. "closed," to pin 105. However, if the self-identifying microphone was of a second type, then identification pin 115 could be electrically disconnected, i.e. "open," from pin 105. By utilizing two or more identification pins, some or all of which could be connected to pin 105, it would be possible to identify a larger number of different microphones.

5.1.2 Analog Coding

Figure 5:
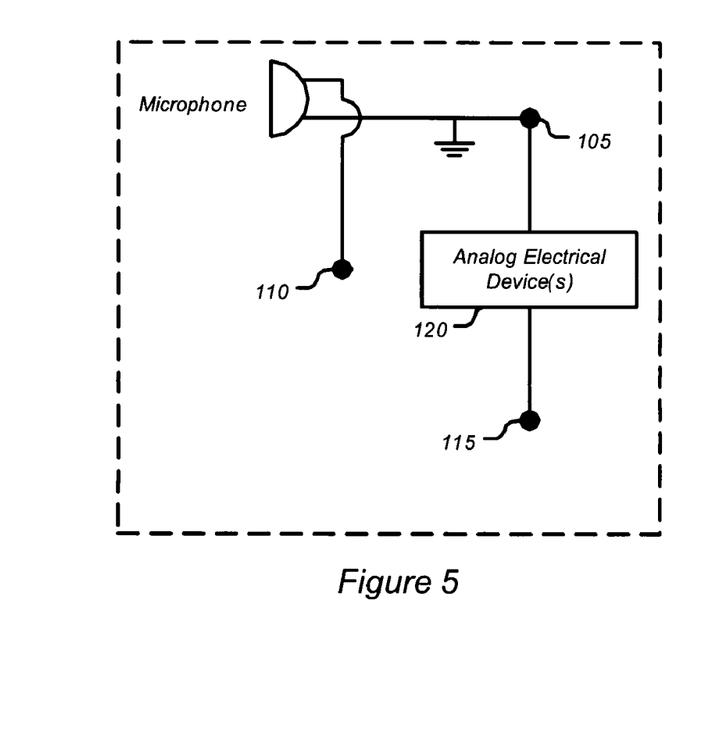
FIG. 5 presents one embodiment of a circuit within the self-identifying microphone of FIG. 1.

In another embodiment of the invention, such as shown in FIG. 5, self-identifying microphone 100 includes analog circuitry that identifies the microphone. For example, one or more analog electrical devices 120, such as resistors, capacitors, and/or inductors, could be placed between pin 105 and pin 115. The value of the analog electrical device(s) could be utilized to identify the microphone. For example, a resistor value of 10K ohms could be utilized to identify a first microphone type, a resistor value of 20K ohms could be utilized to identify a second microphone type, and a resistor value of 50K ohms could be utilized to identify a third microphone type.

5.1.3 Digital Coding

Figure 6:
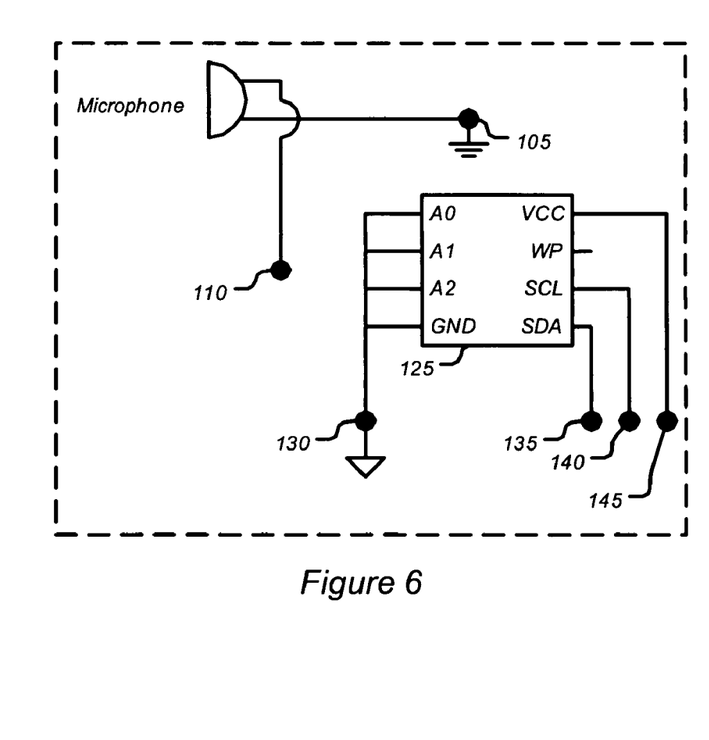
FIG. 6 presents another embodiment of a circuit within the self-identifying microphone of FIG. 1.
Figure 7:
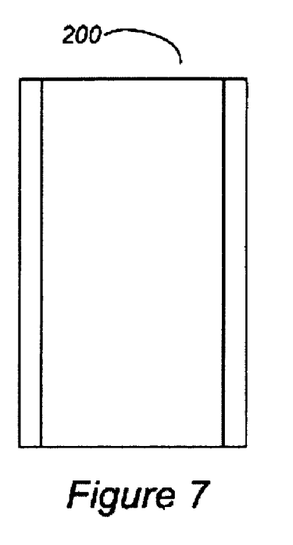
FIG. 7 presents a top view of an interface unit.

In another embodiment of the invention, as shown in FIG. 6, a self-identifying microphone contains digital circuitry that identifies the microphone. For example, the self-identifying microphone may include a serial-electrically-erasable-read-only-memory ("SEEPROM") 125 that stores data indicating the microphone's manufacturer and model number, i.e., the microphone's type. Referring to FIG. 6, pin 130 may be connected to the digital ground pin and the three address pins (A0, A1, and A2) of SEEPROM 125. Similarly, the serial data (SDA) and serial clock (SCL) pins of SEEPROM 125 may be connected to pins 135 and 140. Finally, the VCC pin of SEEPROM 125 may be connected to pin 145.

In some embodiments of the invention, in addition to storing the microphone's manufacturer and model number, the SEEPROM 125 may store additional information related to the microphone. For example, the SEEPROM 125 may store data that indicates the serial number, the date of manufacture, the frequency response, whether the microphone uses phantom power, the desired pre-amplifier gain, and the dynamic response of a self-identifying microphone.

5.1.4 Mechanical Coding

While the above embodiments of the self-identifying microphone all utilized electrical circuits to identify microphone type, other embodiments of the self-identifying microphone utilize physical coding of the microphone to identify the microphone. For example, the length of pins 105 and 110 could be utilized to identify microphone type to an interface unit. Similarly, the diameter and/or thickness of ring 150 could be utilized to identify microphone type. Further, portions of ring 150, such as radial portions, could be removed to indicate microphone type. A number of other physical parameters of a self-identifying microphone could also be utilized to identify a microphone to an interface unit.

5.2 Interface Unit

Figure 8:
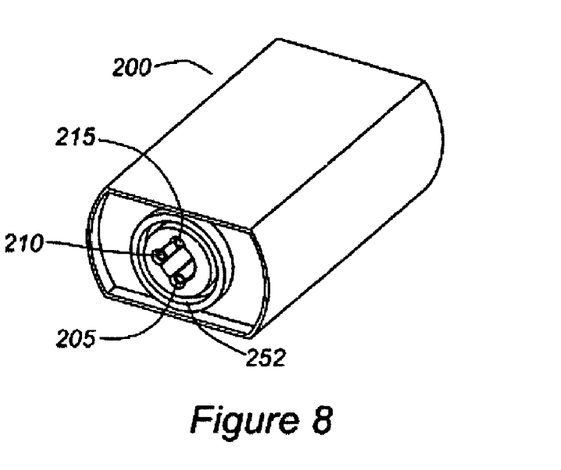
FIG. 8 presents an isometric view of the interface unit of FIG. 7.
Figure 9:
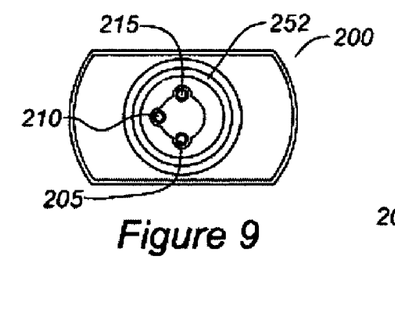
FIG. 9 presents a front view of the interface unit of FIG. 7.
Figure 10:
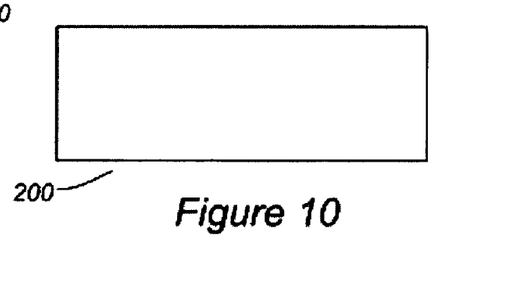
FIG. 10 presents a side view of the interface unit of FIG. 7.

Another embodiment of the invention is an interface unit that interfaces with a self-identifying microphone. The interface unit may have a plurality of electrical contacts, such as sockets. One embodiment of an interface unit is shown in FIGS. 7 through 10. As shown in FIGS. 8 and 9, interface unit 200 includes three sockets 205, 210, and 215 for interfacing with pins 105, 110, and 115 of self-identifying microphone 100. However, different embodiments of the interface unit may utilize a greater or lesser number of electrical contacts. In addition, FIGS. 8 and 9 show that interface unit 200 contains a recess 252 for receiving ring 150 of self-identifying microphone 100.

Figure 11:
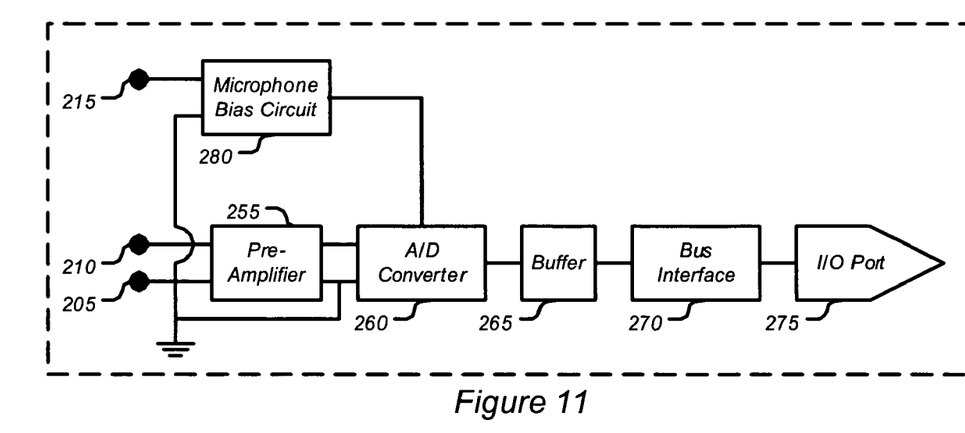
FIG. 11 presents one embodiment of a circuit within the interface unit of FIG. 7.

As shown in FIG. 11, interface unit 200 may include a preamplifier 255 for receiving and amplifying the analog microphone signal received via socket 210. In addition, interface unit 200 may include an analog-to-digital converter 260 that receives the amplified analog microphone signal from the preamp 255 and converts the received analog signal into digital signals. The digital signals can be temporarily stored in buffer 265 and then passed to a bus interface 270. The bus interface 270 may communicate with a computer system via I/O port 275, which may be a USB port, a 1394 bus port, or any other port that couples with a bus having sufficient bandwidth.

5.2.1 Open/Closed Coding

Some embodiments of interface unit 200 include microphone bias circuitry 280 that electrically biases one or more identification pins of a self-identifying microphone. For example, microphone bias circuitry 280 could utilize a 10K ohm pull-up resistor to pull socket 215 to VCC. As shown in FIG. 11, the voltage level of socket 215 can then be determined by analog-to-digital converter 260 and passed, via digital signals, to a computer system via buffer 265, bus interface 270, and I/O port 275. If the computer system determines that the voltage of socket 215 is near ground, then the computer system could determine that the microphone is a first type. Similarly, if the computer system determines that the voltage of socket 215 is near VCC, then the computer system could determine that the microphone is a second type.

5.2.2 Analog Coding

The microphone bias circuitry 280 shown in FIG. 11 may also be utilized to transfer digital information to a computer system that will allow the computer system to identify microphone type based upon the value of one or more analog electrical devices within a self-identifying microphone. For example, microphone bias circuitry 280 could utilize a 10K ohm pull-up resistor to pull socket 215 to VCC. As shown in FIG. 11, the voltage level of socket 215 can then be determined by analog-to-digital converter 260 and passed, via digital signals, to a computer system via buffer 265, bus interface 270, and I/O port 275. If the computer system determines that the voltage on socket 215 is approximately equal to ½ VCC, then the computer system could determine that the microphone includes a 10K ohm resistor between pin 105 and pin 115. Based upon that information, the computer system could determine the microphone type. Similarly, if socket 215 is approximately equal to other voltages, then the size of the resistor between pin 105 and pin 115 of a self-identifying microphone could be similarly determined. Other embodiments of the invention could utilize microphone bias circuitry that applies an alternating voltage, an alternating current, one or more voltage pulses, and/or one or more current pulses to socket 215. The response of socket 215 as measured by ana-log-to-digital converter 260 may be utilized by a computer system to determine the type of a self-identifying microphone.

5.2.3 Digital Coding

Figure 12:
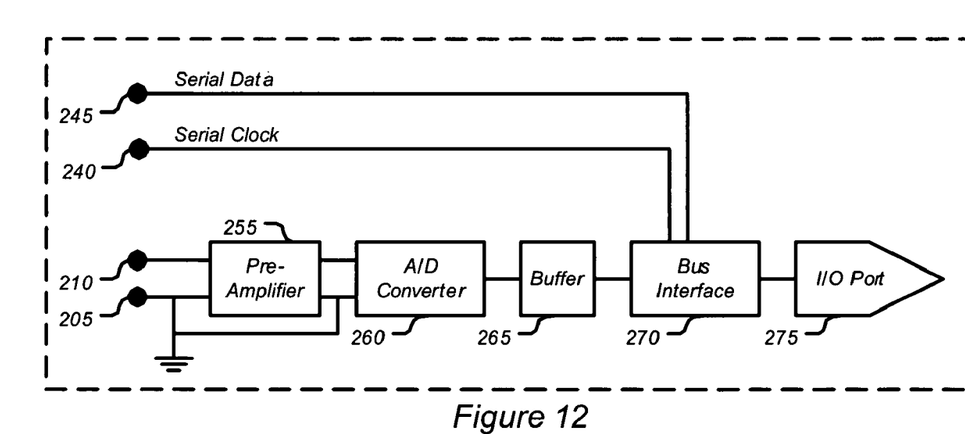
FIG. 12 presents another embodiment of a circuit within the interface unit of FIG. 7.

Still another embodiment of the interface unit is shown in FIG. 12. This embodiment, which is intended to interface with a self-identifying microphone containing a SEEPROM, includes socket 240 and socket 245. Socket 240 interfaces with pin 140 of a self-identifying microphone. Similarly, socket 245 interfaces with pin 145 of a self-identifying microphone. As shown in FIG. 12, sockets 240 and 245 are connected to bus interface 270. (In other embodiments of the invention the serial data may be buffered before being sent to the bus interface 270.) Thus, the computer system can read data from (or write data to) a SEEPROM in a self-identifying microphone. Such data can include, among other things, microphone manufacturer, manufacture date, microphone model number, microphone serial number, microphone frequency response, whether the microphone uses phantom power, the desired pre-amplifier gain, and microphone dynamic response.

5.2.4 Mechanical Coding

Figure 13:
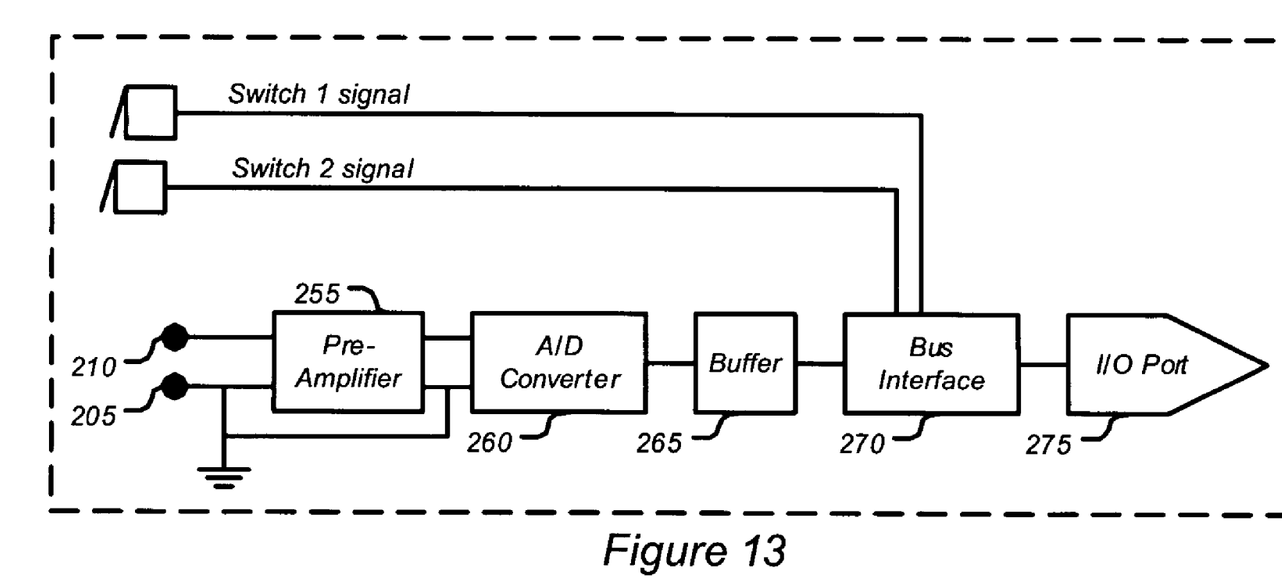
FIG. 13 presents yet another embodiment of a circuit within the interface unit of FIG. 7.

Still another embodiment of the invention is an interface unit that determines microphone type by the physical configuration of the self-identifying microphone. For example, the interface unit could contain one or more limit switches to measure the length of a microphone pin, the diameter of ring 150, the thickness of ring 150, the presence or absence of radial portions of ring 150, and/or any other physical parameters of the self-identifying microphone. The values of the switch(es) could then be passed to the computer system as shown in FIG. 13.

5.2.5 Other Embodiments of an Interface Unit

Figure 14:
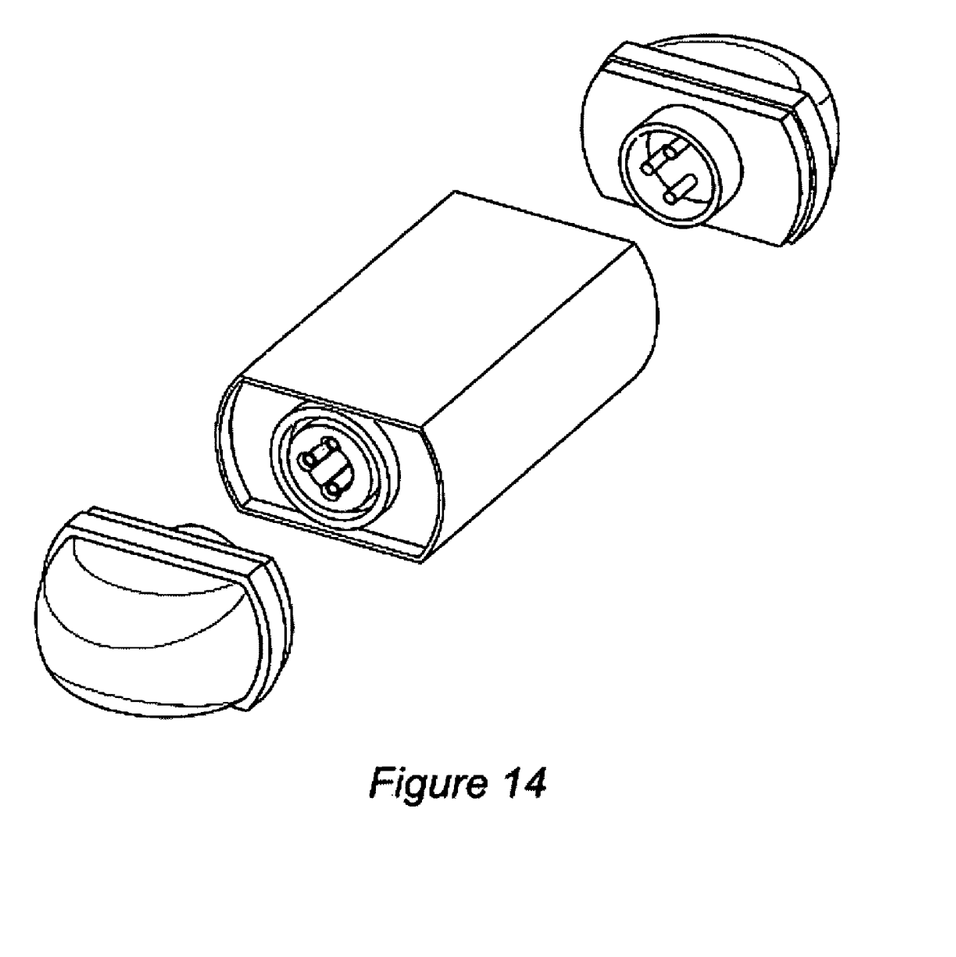
FIG. 14 presents an exploded isometric view of two self-identifying microphones and an interface unit.

The above embodiments of the interface unit describe a single self-identifying microphone coupled to a single interface unit. However, other embodiments of the interface unit can receive two or more microphones. One such interface unit is shown in FIG. 14. Interface units that can interface with two or more microphones may be able to transmit the number of microphones connected to the interface unit, and for each connected microphone, among other things, the microphone manufacturer, manufacture date, the microphone model number, the microphone serial number, the microphone frequency response, whether the microphone uses phantom power, the desired pre-amplifier gain, and the microphone dynamic response.

Other embodiments of the interface unit include multiple I/O ports, such as USB ports, and/or 1394 ports, so that the interface unit can function as a USB or 1394 hub. Interface units containing multiple I/O ports and which function as a hub can be daisy-chained thereby allowing a large number of microphones to be interfaced with a computer system. Such an embodiment of the invention would greatly de-clutter floors of recording studios and performance stages.

Another embodiment of the invention utilizes information received from the microphone to adjust an audio setting of the interface unit. For example, the dynamic response and/or the desired pre-amplifier gain could be received from the microphone and then utilized to set the pre-amplifier gain of the interface unit. Similarly, such microphone information could be sent to a computer system, which could then command the interface unit to set the pre-amplifier gain. In addition, the interface unit could receive information indicating whether the microphone uses phantom power. After receiving information that indicates that the microphone does use phantom power, then the interface would apply phantom power to the microphone. On the other hand, if the received information indicates that the microphone does not utilize phantom power, then no phantom power would be applied to the microphone. The determination of whether to apply phantom power could be made by the interface unit or could be made by a computer system, which would then send an appropriate "phantom power" command to the interface unit.

Still another embodiment of the invention is a microphone that includes a microphone element and some or all of the circuits shown in FIGS. 5 and 11, or 6 and 12. Such a microphone would amplify the signals of the microphone element, convert the amplified signals to digital signals, optionally buffer them, and then transmit them via an I/O port, such as a USB port or a 1394 port. Such a microphone may also be configured to transmit identifying data via the I/O port.

5.3 Method of Configuring a Computer System

Another embodiment of the invention is a method of configuring a computer system based at least in part upon the data received from a self-identifying microphone. A flow chart of this method is shown in FIG. 15.

Figure 15:
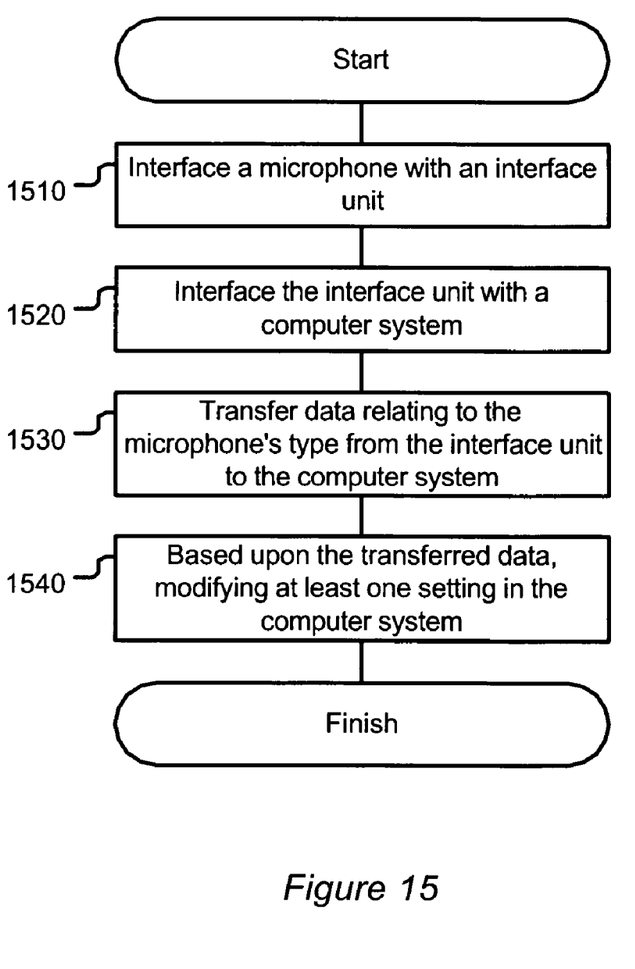
FIG. 15 presents a flow chart of one method of utilizing a self-identifying microphone.

Referring to Block 1510 of FIG. 15, a self-identifying microphone is first interfaced with an interface unit. For example, one of the microphones in FIG. 14 could be plugged into the interface unit in FIG. 14. Next, referring to Block 1520 of FIG. 15, the interface unit could be interfaced with a computer system. For example, the interface unit may be connected to a computer system via a USB cable, a 1394 cable, or a cable of another computer bus that has sufficient bandwidth. (Alternatively, if a self-identifying microphone with a USB, 1394 or similar port was used, then the self-identifying microphone could be directly connected to the computer system via a cable.) Next, referring to Block 1530 of FIG. 15, data, such as but not limited to data indicating the microphone manufacturer, the microphone manufacture date, the microphone model number, the microphone serial number, the microphone frequency response, whether the microphone uses phantom power, the desired pre-amplifier gain, and the microphone dynamic response, to the computer system, could be transferred to the computer system. This data could be determined from, among other things, open/closed circuits on the microphone, analog circuits on the microphone, digital circuits on the microphone, and/or by physical parameters of the microphone. Then, referring to Block 1540 of FIG. 15, a computer program, such as an audio mixing computer program, could automatically, or semi-automatically, adjust one or more settings of the computer system, the interface unit, or even the microphone, based upon at least a portion of the received data. For example, based upon data that identifies the type of a microphone, an audio mixing computer program could automatically adjust frequency response, gain, and/or compression setting of an audio channel. Alternatively, the audio mixing computer program could request user confirmation before adjusting the one or more settings.

One particularly useful application of the above method would occur after an audio engineer has spent significant time adjusting various audio channel settings such as frequency response, gain, and/or compression settings for a particular microphone in an audio mixing program. After "dialing-in" the microphone, the audio engineer could instruct the audio mixing program to associate the "dialed-in" audio channel settings with the particular microphone serial number and/or the microphone type. In addition, the dialed-in audio channel settings could be associated with a particular vocalist, a particular instrumentalist, or a particular instrument. The audio channel settings and their association(s) would then be saved, such as onto a hard disk or a floppy disk, for later use. Then, at a later date, the audio engineer would initiate the method of FIG. 15 by interfacing the microphone to the interface unit and the interface unit to the computer system. Then, after receiving data that identifies the microphone, the audio mixing computer program could automatically load the "dialed in" audio channel settings associated with the microphone. Similarly, the audio mixing program could request the audio engineer to select from several previously saved audio channel settings by selecting a particular vocalist, instrumentalist, or instrument. By automatically or semi-automatically loading the audio channel settings associated with the microphone, the audio engineer would save significant time.

5.4 Conclusion

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. For example, with an appropriate bus interface, the buffer shown in FIGS. 11 and 12 may be removed. Additionally, the above disclosure is not intended to limit the present invention. The scope of the present invention is defined by the appended claims.

It is claimed:

1. A microphone comprising:
   a) a microphone enclosure;
   b) a plurality of electrical contacts for interfacing with an external device; and
   c) a circuit within the microphone enclosure, connected to at least one electrical contact, which transmits data about the microphone to the external device through the at least one electrical contact, wherein the data identifies a type of the microphone.

2. The microphone of claim 1 where the circuit forces the voltage potential between the at least one electrical contact and another of the plurality of electrical contacts to be zero.

3. The microphone of claim 1 where the circuit forces the voltage potential between the at least one electrical contact and a ground electrical contact to be zero.

4. The microphone of claim 1 where the circuit includes a resistor having a first and a second terminal, the first resistor terminal being connected to the at least one electrical contact, the second resistor terminal connected to another of the plurality of electrical contacts.

5. The microphone of claim 1 where the circuit includes a capacitor having a first and a second terminal, the first capacitor terminal being connected to the at least one electrical contact, the second capacitor terminal connected to another of the plurality of electrical contacts.

6. The microphone of claim 1 where the circuit includes an inductor having a first and a second terminal, the first inductor terminal being connected to the at least one electrical contact, the second inductor terminal connected to another of the plurality of electrical contacts.

7. The microphone of claim 1 where the circuit includes a programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, and the microphone dynamic response.

8. The microphone of claim 1 where the circuit includes a serial programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, or the microphone dynamic response.

9. The microphone of claim 1 where the circuit includes a serial electrically erasable programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, or the microphone dynamic response.

10. The microphone of claim of 1, wherein the data about the microphone identifies at least one of the following: the microphone manufacturer, the microphone manufacture date, the microphone model number, the microphone serial number, the microphone frequency response, whether the microphone uses phantom power, the desired pre-amplifier gain, and the microphone dynamic response.

11. An interface unit comprising:
   a) a first connector having a plurality of electrical contacts for interfacing with a microphone, wherein the microphone transmits data about the microphone to the interface unit through the first connector, wherein the data identifies a type of the microphone; and
   b) a second connector having a plurality of electrical contacts for interfacing with a computer system via a digital bus;
      wherein the interface unit is operable to obtain data from the microphone, about the microphone; and
      wherein the interface unit is operable to transmit the data to the computer system.

12. The interface unit of claim 11 further comprising:
   c) an amplifier for amplifying an analog signal received from the microphone;
   d) an analog-to-digital converter, coupled to the amplifier;
   e) a buffer, coupled to the analog-to-digital converter;
   f) a bus interface coupled to the buffer; and
   g) an I/O port for communicating with a computer system.

13. The interface unit of claim 12, wherein the analog-to-digital converter is also coupled to a microphone bias circuit.

14. The interface unit of claim 12, wherein the analog-to-digital converter is also coupled to a microphone bias circuit that contains a resistor having a first terminal and a second terminal, the first resistor terminal connected to at least one of the first connector's plurality of electrical contacts.

15. The interface unit of claim 12, wherein the first connector's plurality of electrical contacts includes a first electrical contact and a second electrical contact;
   wherein the bus interface is coupled to the first electrical contact, which contains a serial clock signal; and
   wherein the bus interface is coupled to the second electrical contact, which contains serial data signals.

16. The interface unit of claim 12, further comprising a switch that is configured to identify a physical parameter of a microphone.

17. The interface unit of claim 16, wherein the switch is coupled to the bus interface.

18. The bus interface of claim 11 further comprising a third connector for interfacing with a second microphone.

19. The interface unit of claim 11 further comprising a third connector for interfacing with another interface unit.

20. The interface unit of claim of 11, wherein the data about the microphone is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

21. A microphone comprising:
   a) a connector having a plurality of electrical contacts for interfacing with a computer system via a digital bus; and
   b) wherein the microphone is operable to transmit data about the microphone to the computer system via the connector, wherein the data identifies a type of the microphone.

22. The microphone of claim 21 further comprising a programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, and the microphone dynamic response.

23. The microphone of claim 21 further comprising a serial programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, or the microphone dynamic response.

24. The microphone of claim 21 further comprising a serial electrically erasable programmable read only memory storing data that identifies at least one of the following: the microphone manufacturer, the microphone manufacture date, the microphone model number, the microphone serial number, the microphone frequency response, whether the microphone uses phantom power, the desired pre-amplifier gain, or the microphone dynamic response.

25. The microphone of claim 21, wherein the data transmitted is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

26. A method of transferring data to a computer system, the method comprising:
   a) interfacing a microphone with an interface unit, wherein the microphone transmits data about the microphone to the interface unit, wherein the data identifies a type of the microphone;
   b) interfacing the interface unit with a computer system; and
   c) transferring data about the microphone from the interface unit to the computer system.

27. The method of claim 26, further comprising modifying at least one setting in the computer system based at least in part on the transferred data.

28. The method of claim 26, further comprising modifying at least one setting in the interface unit based at least in part on the transferred data.

29. The method of claim 26, wherein the data about the microphone is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

30. A method of transferring data to a computer system, the method comprising:
   a) interfacing a microphone with a computer system, wherein the microphone transmits data about the microphone to the interface unit, wherein the data identifies a type of the microphone; and
   b) transmitting data about the microphone, from the microphone to the computer system.

31. The method of claim 30, further comprising modifying at least one setting in the computer system based at least in part on the transferred data.

32. The method of claim 30, further comprising modifying at least one setting in the microphone based at least in part on the transferred data.

33. The method of claim 30, wherein the data about the microphone is related to at least one of the following: the microphone manufacturer, the microphone manufacture date, the microphone model number, the microphone serial number, the microphone frequency response, whether the microphone uses phantom power, the desired pre-amplifier gain, and the microphone dynamic response.

* * * * *

UNITED STATES PATENT AND TRADEMARK OFFICE
CERTIFICATE OF CORRECTION

PATENT NO.         : 7,940,942 B2
APPLICATION NO.    : 10/748024
DATED              : May 10, 2011
INVENTOR(S)        : Alexander H. Little Page 1 of 1

It is certified that error appears in the above-identified patent and that said Letters Patent is hereby corrected as shown below:

On the cover page, item (56), in column 2, under "U.S. Patent Documents", line 7, delete "365/189.01" and insert -- 365/189.14 --, therefor.

On the cover page, item (74), in column 2, in "Attorney, Agent, or Firm", line 1, delete "+" and insert -- & --, therefor.

In column 9, line 44, in claim 20, delete "of claim of" and insert -- of claim --, therefor.

Signed and Sealed this
Sixth Day of December, 2011

David J. Kappos
*Director of the United States Patent and Trademark Office*